US006434267B1

(12) United States Patent
Smith (10) Patent No.: US 6,434,267 B1
(45) Date of Patent: Aug. 13, 2002

(54) INTERPRETATION OF THERMAL PAINT (75) Inventor: Marcus D W Smith, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/272,045

(22) Filed: Mar. 19, 1999

(30) Foreign Application Priority Data

Mar. 26, 1998 (GB) .............................................. 9806322

(51) Int. Cl.⁷ ................................................ G06K 9/00
(52) U.S. Cl. ...................... 382/162; 382/100; 382/167; 374/1; 374/137; 702/99
(58) Field of Search ................................. 382/162, 167, 382/165, 100; 358/518; 348/135, 164; 250/459.1, 461.1; 374/162.1, 161, 137; 702/17, 106, 99; 356/400, 402, 407, 425, 405, 406, 416–419, 243.5

(56) References Cited

U.S. PATENT DOCUMENTS

| 4,885,633 A | | 12/1989 | Buck | |
|---|---|---|---|---|
| 5,129,726 A | * | 7/1992 | Nielsen | ...................... 356/402 |
| 5,239,169 A | | 8/1993 | Thomas | |
| 5,580,172 A | * | 12/1996 | Bhardwaj et al. | ........... 374/137 |

FOREIGN PATENT DOCUMENTS

| DE | 195 37 999 A | | 4/1997 | |
|---|---|---|---|---|
| EP | 707203 A1 | | 4/1996 | |
| EP | 0 707 203 A | | 4/1996 | |
| EP | 0 947 813 A1 | * | 6/1999 | .......... G01K/15/00 |
| GB | 2117902 A | | 10/1983 | |
| GB | 2 306 269 | * | 10/1996 | ............ H04N/9/04 |
| JP | 07 085251 AB | | 3/1995 | |
| WO | 98/11510 | * | 3/1998 | .......... G06T/11/00 |

* cited by examiner

Primary Examiner—Leo Boudreau
Assistant Examiner—Ishrat Sherali
(74) Attorney, Agent, or Firm—W. Warren Taltavull; Manelli Denison & Selter PLLC

(57) ABSTRACT

A method for analysing a thermal paint includes the step of defining a color space in at least two dimensions, the dimensions representing different colors and/or luminance values. The location of reference points, representing calibration data, is defined within the color space for comparison with color information relating to a part to be analysed. Each pixel of an image of the part to be analysed is given a location in color space and the nearest calibration reference point is determined. In this way, the approximate temperature of that point can be established.

24 Claims, 4 Drawing Sheets

INTERPRETATION OF THERMAL PAINT

THE FIELD OF THE INVENTION

The invention relates to a method and apparatus for interpreting thermal paint.

BACKGROUND OF THE INVENTION

Thermal paint undergoes permanent colour changes when subjected to particular temperatures, with the final colour of the paint depending both on the temperature it is subjected to and the time period over which it is held at the raised temperature.

Thermal paint is commonly used in the development of high temperature components of turbines and combustors. The paint is applied to the component in a test situation, and subsequently analysed in order to determine the temperatures which different regions of the component reached during the test.

Conventionally, the analysis of the paint has been done manually. After heating, the colour profile of the paint is such that at certain temperatures the colour changes quite rapidly as perceived by the eye. At these points the temperature for the particular paint will have been calibrated empirically. Thus when the human operator finds the location of these perceived boundaries between colours, the temperatures at the boundaries can be determined and the temperatures between the boundaries interpolated.

The above process is time consuming for the human operator and, where the components include relatively inaccessible regions, can be very inconvenient. Further, the precise location where the colour change occurs may be subjective.

SUMMARY OF THE INVENTION

According to the invention there is provided a method for analysing a thermal paint applied to a part, the method including the steps of:

defining a colour space in at least two dimensions, the dimensions representing different colours and/or luminance values;

defining the location of calibration data comprising points, lines or curves in the colour space and retaining this information in the memory of a computer;

producing an image of the part to be analysed, the image comprising a plurality of pixels each containing colour information;

analysing the colour information to locate a pixel image point in colour space, for one or more of the pixels; and using the computer to compare the pixel image points with the calibration data to determine the calibration point or location on the calibration line or curve which lies closest to the pixel image point in colour space.

Preferably the analysis of the colour information is carried out by the computer.

The colour space is preferably at least three dimensional, the three dimensions preferably representing red, green and blue light or a luminance value plus two out of three values representing the fraction of red, green and blue light present. However the colour space may include more than three dimensions and the dimensions may represent wavelength bands other than red, green and blue.

Preferably the calibration data represents colours in a standard set of colours. Preferably each colour in the set of colours represents a particular temperature reached by the thermal paint. Preferably the method further includes the step of determining the temperature represented by the calibration point or location on the calibration line or curve which lies closest to the pixel image point in colour space.

Preferably the calibration data comprises a plurality of points in colour space. Preferably the method includes the step of establishing the location of Voronoi polygons in colour space around the points in the calibration data. Preferably the method further includes the step of determining in which Voronoi polygon each pixel image point is located, in order to determine the calibration data point which lies closest to the pixel image point in colour space.

Preferably the calibration data points are divided into bands, each band containing a plurality of calibration data points. The method may include the step of checking in which band a particular calibration data point lies. The method may include the process of determining which of two calibration data points, each equally close to a pixel image point in colour space, is the correct calibration data point. This process preferably includes the step of checking in which band each of the two calibration data points lies and checking in which band the calibration data point assigned to one or more neighbouring pixel image points lie.

Preferably the part to be analysed is illuminated by a broad optical band width light source of substantially constant optical intensity across substantially the whole band width, which may be produced by a xenon flash. Preferably normally incident illumination is used.

The method may include the step of polarising the light using a polariser and filtering out directly reflected light using a cross-polariser.

Preferably the image is produced using a digital camera, preferably including three charge coupled devices.

The colour information may be filtered to remove unwanted information. A smoothing function may be used.

The colour information may be modified to compensate for brightness variations caused by the shape of the part or by camera distortions.

The colour information may be modified to compensate for non uniform illumination, or diffuse reflections.

Subsequently, the colour information may be analysed such that information relating to absolute brightness is substantially excluded.

According to the invention, there is also provided apparatus for carrying out a method according to any of the previous definitions.

According to the invention there is also provided apparatus for analysing a thermal paint applied to a part, the apparatus including:

means for defining a colour space in at least two dimensions, the dimensions representing different colour and/or luminance values;

means for defining the location of calibration data comprising points, lines or curves in the colour space and retaining this information in the memory of a computer;

means for producing an image of the part to be analysed, the image comprising a plurality of pixels each containing colour information;

means for analysing the colour information to locate a pixel image point in colour space, for each pixel; and means for using the computer to compare each pixel image point with the calibration data to determine the calibration point or location on the calibration line or curve which lies closest to the pixel image point in colour space.

Preferably the apparatus includes a broad optical band width light source for producing light having a substantially constant optical intensity across the spectrum. The apparatus may include a xenon flash.

Means may be provided for polarising the light and filtering out from the image reflected light of generally cross-polarisation.

Preferably the means for producing an image of the part includes a digital camera, preferably including three charge coupled devices.

According to a further aspect of the invention there is also provided a method for analysing a thermal paint applied to a part, the method including the steps of:

defining a colour space in at least three dimensions, the dimensions representing different colours and/or luminance values;

defining the location of calibration data comprising points, lines or curves in the colour space and retaining this information in the memory of a computer;

producing an image of the part to be analysed, the image comprising a plurality of pixels each containing colour information;

analysing the colour information to locate a pixel image point in colour space, for one or more of the pixels; and using the computer to compare the pixel image points with the calibration data to determine the calibration point or location on the calibration line or curve which lies closest to the pixel image point in colour space;

characterised in that the image pixels contain colour information represented by at least one more different colour and/or luminance values than are used to define the colour space.

According to a yet further aspect of the invention there is provided a method for analysing a thermal paint applied to a part, the method including the steps of;

defining a colour space in at least three dimensions, the dimensions representing different colours and/or luminance values;

defining the location of calibration data comprising part, lines or curves in the colour space and retaining this information in the memory of a computer;

producing an image of the part to be analysed, the image comprising a plurality of pixels each containing colour information;

analysing the colour information to locate a pixel image point in colour space, for one or more of the pixels; and using the computer to compare the pixel image points with the calibration data to determine the calibration point or location line or curve which lies closest to the pixel image point in the colour space;

characterised in that the step of defining the location of calibration data also includes computing for each calibration point, line or curve a structure within the colour space which surrounds that calibration point, line or curve and with which all locations are closer to that calibration point, line or curve than to any other calibration point, line or curve in the calibration data.

Preferably the step of determining the calibration point or location on the calibration line or curve which lies closest to the pixel image point comprises determining within which structure the pixel image point lies.

BRIEF DESCRIPTION OF THE DRAWINGS

The invention will now be described for the purposes of illustration only with reference to the accompanying drawings, in which.

DETAILED DESCRIPTION

Overview of Method and Apparatus

The method and apparatus as described below provides means for the automatic analysis of thermal paint images. An image of the component to be analysed is produced using a digital camera. Each pixel within the image is subsequently analysed by a computer to determine which of a set of predetermined colours it is closest to. Each of these predetermined colours represents the colour of the thermal paint at a particular known temperature and this colour and temperature information is stored in the computer's memory. Thus the temperature of the component at the point represented by the pixel can be worked out. The preferred method and apparatus is described in more detail below.

The Camera

Digital cameras include one or more charge coupled device (CCD) chips, which are divided into a number of pixels (for example 1280×1,000 or 3,072×2,048). In conventional cameras each pixel is responsive to one of red, green or blue light and produces an output signal which is proportional to the intensity of the red, green or blue light falling on it. These output signals are referred to as "R", "G" and "B" for red, green and blue light respectively.

"Single chip" cameras include one CCD chip, having a distribution over the surface of the chip of different pixels. One set of pixels is responsive to red light, one set to green light and one set to blue light. The pixels in the various sets are spread relatively evenly over the chip, although there may not be the same number of pixels of each colour (as one colour may be used to supply luminance levels common to all three sets of pixels). At each pixel in the image, information is therefore provided about one colour of light, namely red, blue or green light. For each pixel, information relating to the remaining colours must be extrapolated from the colour information obtained in respect of neighbouring pixels.

A "three chip" camera uses a prism to split the image into three separate images: a red image, a blue image and a green image. Each image is received by a separate chip such that red, green and blue light information is available for every pixel on the respective chip. These cameras therefore provide superior image resolution and less ambiguous colour information.

As an alternative to either of the above, a black and white camera may be used, with red, green and blue filters placed in front of the camera in turn to thereby provide colour information for each pixel, a separate image being recorded for each colour.

For the present invention, a three chip camera is preferred. It is not essential to use red, green and blue sensitive cameras, but these are commonly available and thus convenient to use.

Calibration

Before any analysis of thermally painted parts can be carried out, it is necessary to create a set of reference calibration colour values for which the associated temperatures are known, for the particular thermal paint being used.

This may be done using calibration coupons. Calibration coupons are usually nickel alloy plates about 25 mm square or 12 mm×25 mm in size.

These coupons are prepared by coating them in the thermal paint to be calibrated, and heating in a calibrated furnace. The coupons are heated to respectively different constant temperatures and, for each temperature, different coupons are heated for respectively different times (3, 5, 10, 30 or 60 minutes). Typically for a thermal paint, these coupons will cover most of the usable temperature range in 10° C. steps for each running time. Alternatively, where a small temperature change produces rapid colour changes, coupons may be provided at narrower temperature intervals. Each set of calibration coupons is placed in a microscope slide holder in a fixed position. By marking four known points on the microscope slide holder and inputting data via a spread sheet, a calibration coupon colour temperature assignment program is used to capture the colour temperature data for each coupon, and store the information in a computer. There may be as many as eighty coupons for a particular thermal paint.

Thus, for each calibration coupon, colour data (i.e. R, G, B values) is held in the computer and linked to an associated temperature. In this way the colour temperature relationship for the thermal paint is defined across its whole range.

Figure 1:
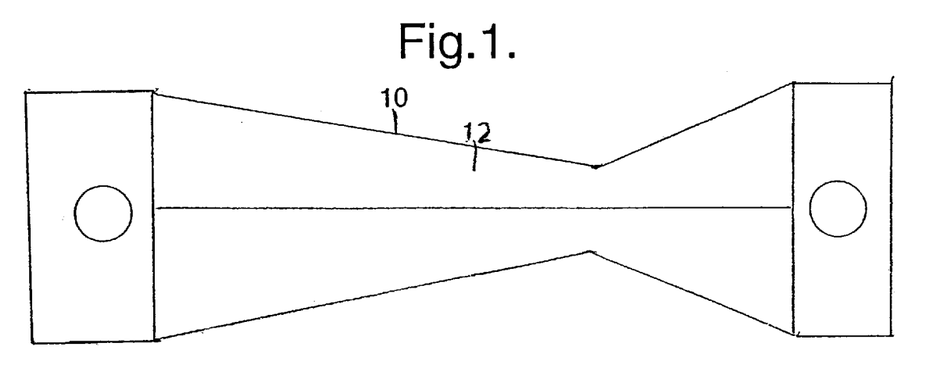
FIG. 1 is a bow tie test piece for the purposes of calibration.

As an alternative to calibration coupons, colour data may be taken from components, or bow tie test pieces, which have been manually analysed. A bow tie test piece is illustrated in FIG. 1. Such pieces give an even temperature distribution across their surface, and the temperature at various points is measured either by thermocouples or by the comparison of a known and an unknown paint (as shown in FIG. 1). Such a comparison may be carried out to determine the similarity of two paint batches. Alternatively, the test piece may be heated by passing an electrical current through it, and calculating the temperature from its resistance, which is known and which varies due to the shape of the bow tie. Colour data from a bow tie test piece may be taken using a computer program which allows a rectangular area of any angle over an image to be sampled. The temperature information from the thermocouples can be analysed together with the colour sampling information to provide temperature estimates for the entire sample.

The test piece of FIG. 1 illustrates the way in which thermal paint colours form in clearly defined bands 10, 12.

The colour data is taken from the computer by sampling rectangular areas of approximately uniform colour. The areas are defined by drawing a line along the image in the direction of the temperature change, and marking the colour boundaries or other isotherms at right angles to the first line. The width of the rectangles can be altered to vary the precision.

Calibration data can be captured from several sets of calibration coupons, or multiple components or non-continuous areas of components. Such colour data needs to be joined. In the case calibration coupons which do not overlap in temperature they are joined with the hot set immediately leading the cold. For components with continuous temperature distributions there must be an overlap to allow a smooth join to be made between them. The system finds the join with the least colour discontinuity within a user defined temperature discontinuity (for e.g. 10° C.).

Paint Calibration File

Once the raw colour temperature information has been acquired, a calibration file must be produced to allow the pixels in the image to subsequently be interpreted in an unambiguous way.

This process is called colour-temperature banding. The raw colour data is assigned to "bins" which are linearly spaced in temperature. A paint might include about fifty bins each relating to a given temperature range. The bins are then assigned to "bands", each band including about five to eight bins.

The use of bins and bands has been adopted because of the complexity of colour curves for typical thermal paints. Unfortunately many existing thermal paints are ambiguous in temperature when three colours or wavelength bands are measured. It may be that for a particular paint, a pixel could be assigned to either of two widely spaced bins, which have similar average colour profiles. Thus, for a particular point on a component, it could be unclear as to which bin it should fall in given only its colour information. However, if information about the surrounding pixels is also considered, the correct band may be determined unambiguously and the correct bin within said band may then be found with no ambiguity.

The bins are assigned to bands by an operator, for each paint. The number of bins depends upon the temperature range to be covered by a single bin. The temperature range may be constant, or may vary across the temperature range of a paint. In determining the temperature range of each bin, the operator must take account of the rate of change of colour of the paint, in colour space, as a function of temperature. Where there is a rapid colour change, more calibration points, at smaller temperature separations, may be required. As there are preferably between five and eight bins in each band, the rate of change of colour will correspondingly affect the temperature range of the relevant bands.

The colour ambiguity of some paints, as discussed earlier, also affects the creation of bands. In order to overcome the ambiguity associated with certain bins, it is essential that the bands which each ambiguous bin is allocated to are widely separated in temperature. Each band having an ambiguous bin must have neighbouring bands which do not contain an ambiguous bin, in order to correctly allocate ambiguous bins to the correct band. Preferably, a paint has a maximum of two bands containing ambiguous bins.

Image Acquisition

It is important that the component to be analysed is illuminated in such a way as to avoid gloss or glaze reflection problems or complicated shadows. "Glazing" results from the fact that at higher temperatures the paint binding starts fusing and causes some direct reflection back of light. Such reflection contains very little colour information, appearing white because it has been reflected rather than having been scattered by the paint pigment.

The problem of glazing may be overcome by using olarised light. The polarisation of the directly reflected light is preserved and can be filtered out by putting a cross-polariser across the camera. The polarisation of the light that has been scattered, and therefore contains colour information tends not to be preserved because of the repeated reflections which it undergoes, and is therefore passed by the cross-polariser. This method avoids the glazing problem but greatly reduces the brightness of the image (as the pigment reflection still has a large bias towards the original polarisation of the light).

Figure 2A:
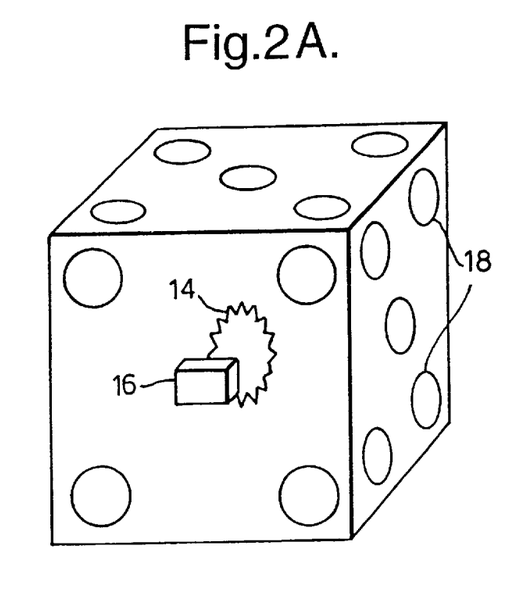
FIGS. 2A to 2C illustrate different types of illumination.
Figure 2B:
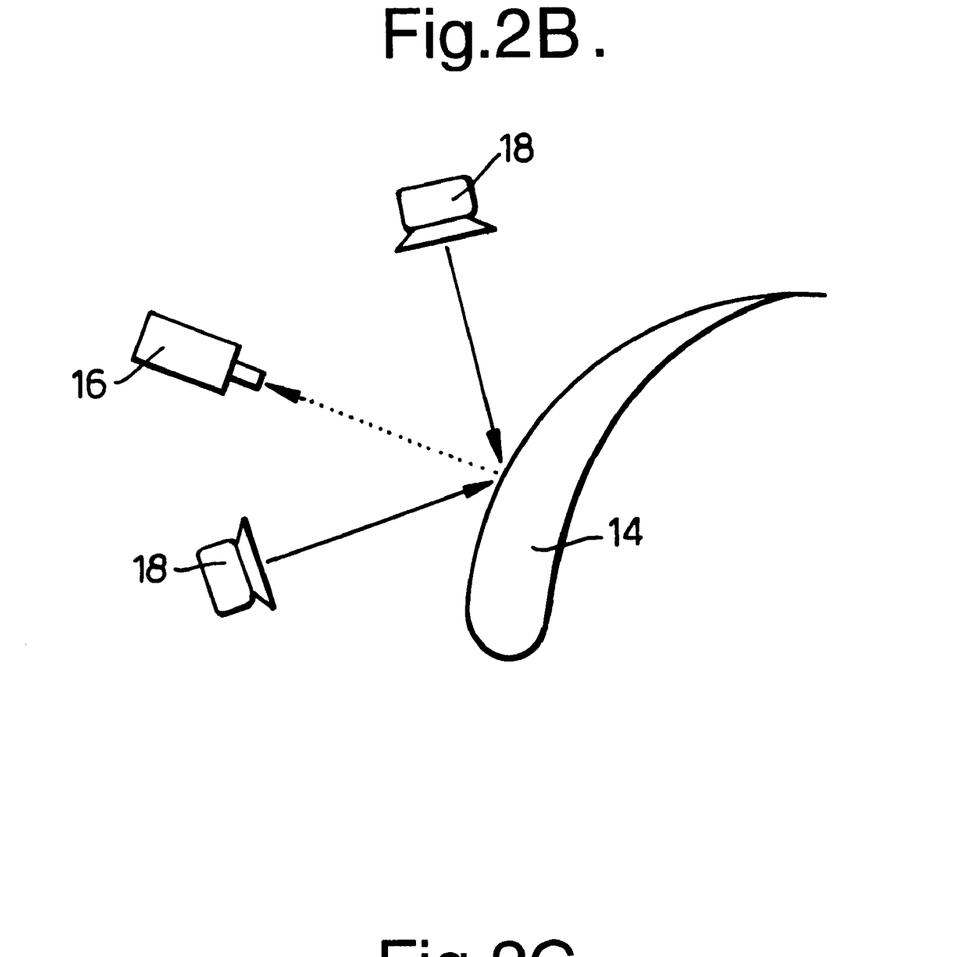
Figure 2C:
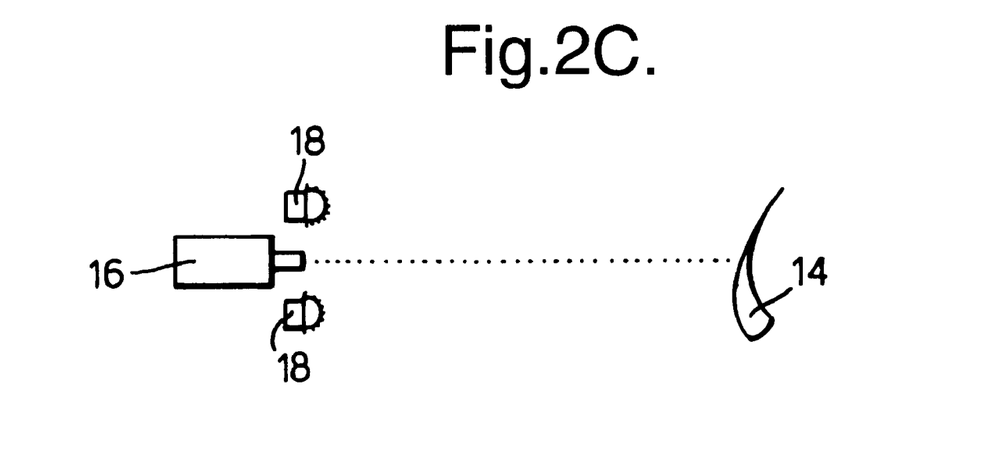

Various different types of illumination include light box illumination, 45° incidence illumination and normal incidence illumination, as illustrated in FIGS. 2A, 2B and 2C respectively. In each figure, the part to be analysed is labelled 14, the camera is labelled 16 and the lights are labelled 18. All round illumination has the disadvantage that it is difficult to separate out reflections from desired light. 45° illumination avoids glazing but necessitates a large amount of camera movement as only a specific area is illuminated. Normal illumination is preferred.

First the light exposure is estimated using a light meter, then an image is calibrated by using a black and white calibration card. This allows normalisation of each R, G and B colour.

Initial Image Processing

Because most commonly available cameras are intended to produce images which mimic those seen by the human eye, the relationship between brightness and camera output is not necessarily linear. This takes into account the fact that the human eye compensates for brightness. The relationship between brightness and output is referred to as the gamma curve and, for industrial applications, such a curve is undesirable. Instead, the relationship should be linear. Therefore this curve is corrected by the computer in order to provide a linear relationship between the measured brightness of each R, G, B colour and the input brightness.

The image produced by the camera may be filtered to remove unwanted information, such as small spots of colour caused by, for example, soot. The image may be smoothed by setting the colour value of a central pixel in a group of pixels to the average of all the pixels in the area. Smoothing by averaging or median filtering may be carried out over areas such as 3×3 pixels, 5×5 pixels or 7×7 pixels.

The image may also be processed to compensate for brightness variations caused by the three dimensional shape of the part being analysed or by camera distortion. The computer used for the image processing may be provided with information as to the shape of the part. The image produced by the camera may then be modified according to a function which produces a geometrical transformation to take into account the shape of the part.

A correction may also be applied for any non-uniform illumination. A piece of white paper with crosses evenly distributed upon it is photographed to measure the spread of light from the flash. A function may then be determined which relates the illumination to the location of points relative to the light source and the camera lens. This function can be used to correct for uneven illumination. Diffuse reflection may also need to be taken into account.

The above techniques are particularly applicable to application where a boroscope is used to obtain an image of the inside of an engine, for example. This can cause severe image distortion.

Interpretation

Once an image of a component has been captured, and each pixel assigned R, G and B values, these values must be converted into temperatures. To do this each pixel must be allocated to a bin, for which there is a known associated temperature.

The following method is used. Where l is the luminance, or brightness and R, G and B are the values measured and corrected by the camera which are usually in 8 bit colour, i.e. 0–255 range byte values $$l = (R+G+B)$$

$$r = SF \frac{R}{l}$$

$$g = SF \frac{G}{l}$$

$$b = SF \frac{B}{l}$$

The variables r, g and b are the colour or chromaticity co-ordinates, b is not used as the colour can be sufficiently described by three co-ordinates. SF is a scale factor nominally set at 1,000 to the r, and g variables into the two byte integer range, and l similarly is a two byte integer. Thus the R, G, B output for each pixel can be analysed to produce r, g and l values.

Figure 3:
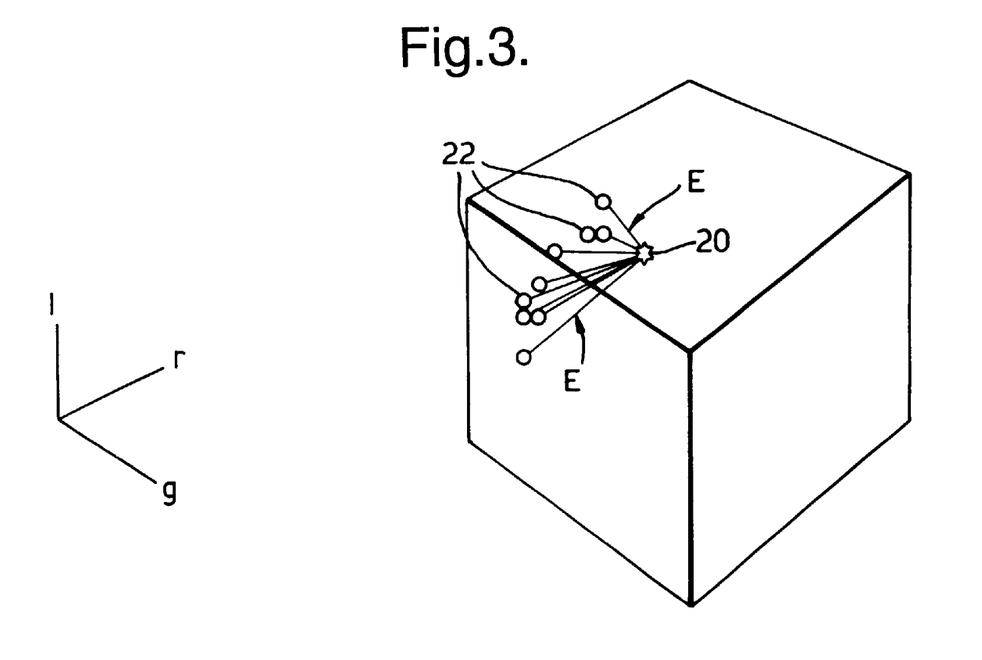
FIG. 3 illustrates the concept of three dimensional colour space.

The r, g and l values for each pixel define a pixel image point 20 in three dimensional colour space, as illustrated in FIG. 3. All the calibration bins can also be analysed in the above way to produce calibration points 22 in colour space. The aim is therefore, for each pixel point, to find the nearest calibration point and thus to estimate the temperature at the location represented by that pixel. Therefore, the distance in colour space (the error, E) between the pixel to be interpreted and each standard paint bin colour from the calibration file is calculated, using the following formula:

$$E_j = \sqrt{(r-r_j)^2 + (g-g_j)^2 + \lambda(l-l_j)^2}$$

The calibration point closest to the pixel image point (having the minimum distance or error, E) is then found from those calculated and the pixel is assigned to that bin.

Figure 4:
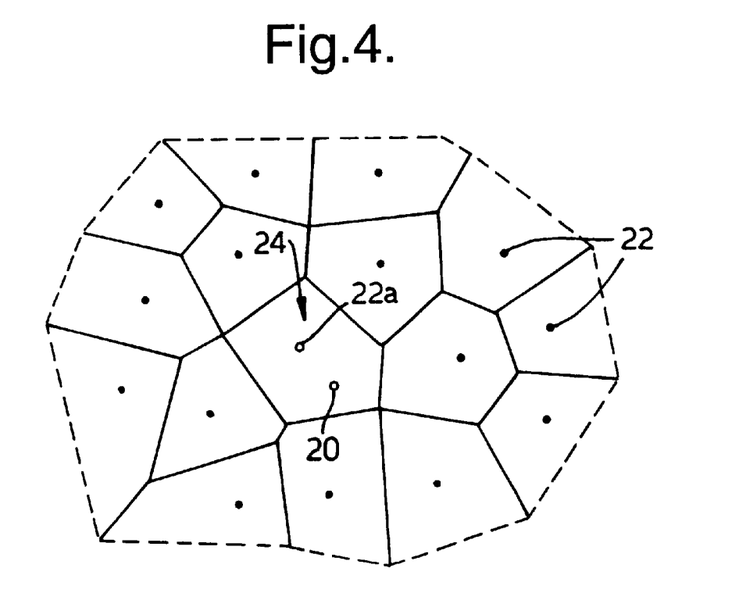
FIG. 4 illustrates Voronoi polygons in two dimensions.

To reduce the number of computations required, a Voronoi diagram, or Voronoi polygons, may be used. A two dimensional version of this structure is shown in FIG. 4, but the approach is equally applicable to three or more dimensions. A structure is computed such that each calibration point 22 (representing a standard bin colour) is surrounded by a convex polygon. All points within this polygon are closer to that calibration point than to any other calibration point in the set. Thus, given the Voronoi polygons of the set of calibration points 22 and a pixel image point 20, the calibration point 22 nearest to the pixel image point 20 can be established simply by determining in which polygon the pixel image point 20 lies. In FIG. 4, the pixel image point lies in a polygon 24, and is therefore closest to the calibration point 22a.

The sides of each polygon are the perpendicular bisectors of lines joining the calibration point with its neighbouring calibration points. Established algorithms can be used to create a Voronoi polygon structure around the set of calibration points representing the standard bin colours.

In order to establish the polygon in which the pixel point lies, the polygon vertices may be sorted in ascending order of their y co-ordinates, thus determining in which zone the pixel point lies. This narrows down substantially the number of polygons, which can then in turn be sorted and searched by x co-ordinate.

After all the pixels have been assigned to bins, some further processing takes place to reduce noise and eliminate any band ambiguity (discussed above under "calibration"). In order to reduce noise, the temperature value allocated to each pixel is compared to the temperature values of its neighbouring pixels. If the value is significantly higher than those of its neighbours, this is determined to be an error point. A replacement temperature value, for example the average value of its neighbours, is then allocated to the pixel.

Figure 5:
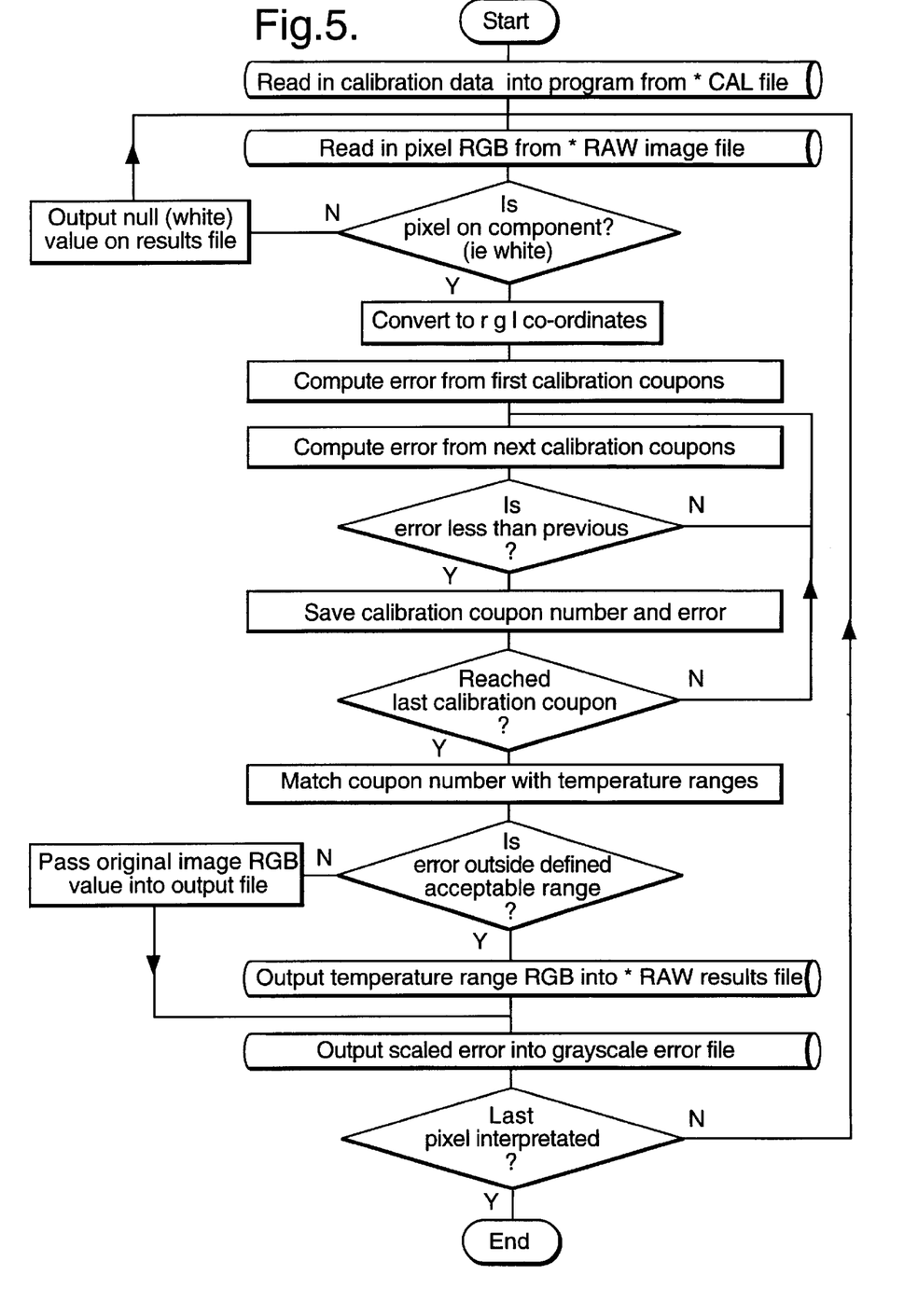
FIG. 5 is a possible flow diagram for carrying out a process according to the invention.

FIG. 5 is a flow diagram illustrating one way in which a computer may carry out the process of the invention. This method finds the calibration point nearest to the pixel image point by checking the error distance for all calibration points. This method is inferior to the method which uses Voronoi polygons.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method for analyzing a thermal paint applied to a part, the method including the steps of:

defining a color space in at least two dimensions, the dimensions representing different colors and/or luminance values;

defining the location of calibration data comprising points, lines or curves in the color space and retaining this information in the memory of a computer;

producing an image of the part to be analyzed, the image comprising a plurality of pixels each containing color information;

analyzing the color information to locate a pixel image point in color space, for one or more of the pixels;

using the computer to compare the pixel image points with the calibration data to determine the calibration point or location on the calibration line or curve which lies closest to the pixel image points in color space, the method Including the step of establishing the location of Voronoi polygons in color space around the points in the calibration data.

2. A method according to claim 1, wherein the analysis of the colour information is carried out by the computer.

3. A method according to claim 1 wherein the colour space is at least three dimensional, the three dimensions representing red, green and blue light or a luminance value plus two out of three values representing the fraction of red, green and blue light present.

4. A method according to claim 1, wherein the calibration data represents colours in a standard set of colours.

5. A method according to claim 4, wherein each colour in the set of colours represents a particular temperature reached by the thermal paint.

6. A method according to claim 5, wherein the method further includes the step of determining the temperature represented by the calibration point or location on the calibration line or curve which lies closest to the pixel image point in colour space.

7. A method according to claim 1, wherein the method further includes the step of determining in which Voronoi polygon each pixel image point is located, in order to determine the calibration data point which lies closest to the pixel image point in color space.

8. A method according to claim 1, wherein the calibration data points are divided into bands, each band containing a plurality of calibration data points.

9. A method according to claim 8, the method including the step of checking in which band a particular calibration data point lies.

10. A method according to claim 9, the method including the process of determining which of two calibration data points, each equally close to a pixel image point in colour space, is the correct calibration data point.

11. A method according to claim 10, including the step of checking in which band each of the two calibration data points lies and checking in which band the calibration data point assigned to one or more neighbouring pixel image points lie.

12. A method according to claim 1, wherein the image is produced using a digital camera.

13. A method according to claim 12, wherein the camera includes three charge coupled devices.

14. A method according to claim 1, wherein the colour information is filtered to remove unwanted information.

15. A method for analyzing a thermal paint applied to a part, the method including the steps of:

defining a color space in at least two dimensions, the dimensions representing different colors and/or luminance values;

defining the location of calibration data comprising points, lines or curves in the color space and retaining this information in the memory of a computer;

producing an Image of the part to be analyzed, the image comprising a plurality of pixels each containing color information;

analyzing the color information to locate a pixel image point in color space, for one or more of the pixels;

using the computer to compare the pixel image points with the calibration data to determine the calibration point or location on the calibration line or curve which lies closest to the pixel image points in color space, the part to be analyzed being illuminated by a broad optical bandwidth light source of substantially constant optical intensity across substantially the whole band width, and wherein normally incident illumination is used, the method including the step of polarizing the light using a polarizer and filtering out directly reflected light using a cross-polarizer.

16. Apparatus for analyzing a thermal paint applied to a part, the apparatus including:

means for defining a color space in at least to two dimensions, the dimensions representing different color and/or luminance values;

means for defining the location of calibration data comprising points, lines or curves In the color space and retaining this information in the memory of a computer;

means for producing an image of the part to be analyzed the image comprising a plurality of pixels each containing color information;

means for analyzing the color information to locate a pixel image points in color space, for each pixel; and means for using the computer to compare each pixel image point with the calibration data to determine the calibration point or location on the calibration line or curve which lies closest to the pixel image point in color space, the apparatus further including a broad optical band-width light source for producing light having a substantially constant optical intensity across the spectrum, the apparatus further including means for polarizing the light and filtering out from the image reflected light of generally cross-polarization.

17. Apparatus according to claim 16, including a xenon flash.

18. Apparatus according to claim 16, wherein the means for producing an Image of the part includes a digital camera.

19. Apparatus according to claim 16, wherein the camera includes three charge coupled devices.

20. A method for analysing a thermal paint applied to a part, the method including the steps of:

defining a colour space in at least three dimensions, the dimensions representing different colours and/or luminance values;

defining the location of calibration data comprising points, lines or curves in the colour space and retaining this information in the memory of a computer;

producing an image of the part to be analysed, the image comprising a plurality of pixels each containing colour information;

analysing the colour information to locate a pixel image point in colour space, for one or more of the pixels; and using the computer to compare the pixel image points with calibration data to determine the calibration point or location on the calibration line or curve which lies closest to the pixel image point in the colour space;

wherein the step of defining the location of calibration data also includes computing for each calibration point, line or curve a structure within the colour space which surrounds that calibration point, line or curve and with which all locations are closer to that calibration point, line or curve than to any other calibration point, line or curve in the calibration data.

21. A method according to claim 20 in which the step of determining the calibration point or location on the calibration line or curve which lies closest to the pixel image point comprises determining within which structure the pixel image point lies.

22. A method for analyzing a thermal paint applied to a part, the method Including the steps of:

defining a color space in at least two dimensions, the dimensions representing different colors and/or luminance values;

defining the location of calibration data comprising points, lines or curves in the color space and retaining this information In the memory of a computer;

producing an image of the part to be analyzed, the image comprising a plurality of pixels each containing color information;

analyzing the color information to locate a pixel image point in color space, for one or more of the pixels;

using the computer to compare the pixel image points with the calibration data to determine the calibration point or location on the calibration line or curve which lies closest to the pixel image points in color space, the color information being modified to compensate for brightness variations caused by the shape of the part Or by camera distortions.

23. A method for analyzing a thermal paint applied to a part, the method including the steps of:

defining a color space in at least two dimensions, the dimensions representing different colors and/or luminance values;

defining the location of calibration data comprising points, lines or curves in the color space and retaining this information In the memory of a computer;

producing an image of the part to be analyzed, the image comprising a plurality of pixels each containing color information;

analyzing the color information to locate a pixel image point in color space, for one or more of the pixels;

using the computer to compare the pixel image points with the calibration data to determine the calibration point or location on the calibration line or curve which lies closest to the pixel image points in color space, wherein the color information is modified to compensate for nonuniform illumination, or diffuse reflections.

24. A method for analyzing a thermal paint applied to a part, the method including the steps of:

defining a color space in at least two dimensions, the dimensions representing different colors and/or luminance values;

defining the location of calibration data comprising points, lines or curves in the color space and retaining this information in the memory of a computer;

producing an image of the part to be analyzed, the image comprising a plurality of pixels each containing color information;

analyzing the color information to locate a pixel image point in color space, for one or more of the pixels;

using the computer to compare the pixel image points with the calibration data to determine the calibration point or location on the calibration line or curve which lies closest to the pixel image points in color space, wherein the color information is analyzed such that information relating to absolute brightness is substantially excluded.

* * * * *